3,707,490
PROCESS FOR PREPARING 1,3,5(10),6,8-PENTAENE STEROIDS AND INTERMEDIATES
John A. Edwards, Los Altos, and Jack Ackrell, Mountain View, Calif., assignors to Syntex Corporation, Panama, Panama
No Drawing. Filed Apr. 27, 1970, Ser. No. 32,367
Int. Cl. C07c 169/08
U.S. Cl. 260—397.45     24 Claims

ABSTRACT OF THE DISCLOSURE

Process for preparing 1,3,5(10),8,11-pentaene and 1,3,5(10),6,8-pentaene steroids from 1,3,5(10),9(11)-tetraene steroids using a benzoquinone step followed by a dehydrogenation-hydrogenation sequence. The 1,3,5(10),8,11-pentaenes are new and useful as estrogenic agents and intermediates. Other useful intermediates described are novel 12α-hydroxy(alkoxy)-1,3,5(10),9(11)-tetraene steroids. The overall conversion of $\Delta^{9(11)}$-estrone to equilenin is illustrated as representative of the invention.

---

The present invention relates to a new process in steroid chemistry and to new compounds prepared in accordance with said process.

More particularly, the present invention is directed to a new process useful for preparing new 1,3,5(10),8,11-pentaene steroids and 1,3,5(10),6,8-pentaene steroids, e.g., equilenin, from the corresponding 1,3,5(10,9(11))-tetraene steroids, e.g. $\Delta^{9(11)}$-estrone. It is further directed to new 12α-hydroxy(alkoxy)-1,3,5(10),9(11)-tetraene intermediate compounds prepared when practicing the aforementioned process.

The present invention can be depicted as follows:

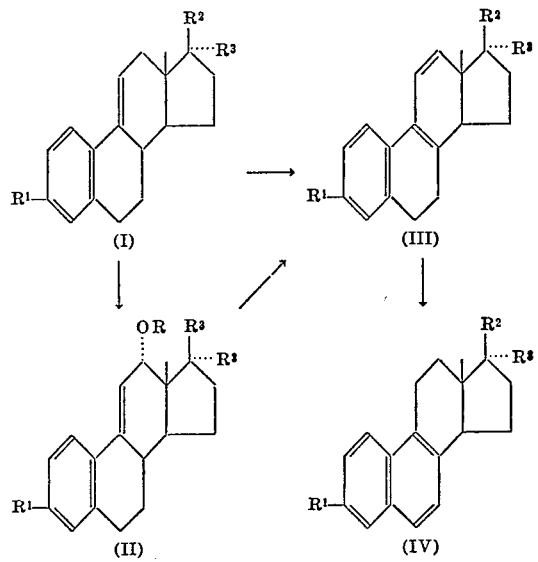

In the above formulas,

R is hydrogen or lower alkyl;
$R^1$ is hydroxy or a conventional ester or ether thereof;
$R^2$ is hydroxy or a conventional ester or ether thereof;
$R^3$ is hydrogen, alkyl of 1 to 3 carbon atoms, alkenyl of 1 to 3 carbon atoms, or alkynyl of 1 to 3 carbon atoms; or
$R^2$ and $R^3$ taken together are an oxo group.

The present invention in a first, principal aspect is directed to a process which comprises treating an estra-1,3,5(10),9(11)-tetraene steroid (I) with a benzoquinone to prepare the corresponding estra-1,3,4(10),8,11-pentaene steroid (III).

The present invention in a second, principal aspect is directed to a process which comprises treating an estra-1,3,5(10),9(11)-tetraene steroid (I) with a benzoquinone to prepare the corresponding estra-1,3,5(10),8-11-pentaene steroid (III) and converting the latter to the corresponding estra-1,3,5(10),6,8-pentaene steroid (IV) with a dehydrogenation-hydrogenation sequence.

The reaction (I→III) is favored when employing anhydrous or substantially anhydrous conditions. When the reaction is conducted under aqueous conditions or in the presence of a primary or secondary lower alkanol, the 12α-hydroxy and -lower alkoxy intermediates (II) are respectively formed in predominant proportion to compound (III). Intermediate compound (II) slowly converts to the corresponding compound (III) in the reaction mixture or it can be isolated via conventional techniques. The conversion of (II) to (III) in the 12α-alkoxy series, is favored by conducting the reaction (I)→(III) under acidic conditions, such as can be provided by dilute acid, i.e., a dilute solution of a mineral or carboxylic acid, e.g., oxalic acid.

After isolation, if desired, the 12α-hydroxy(alkoxy) compound (II) can be converted, if desired, to compound (III) with a separate dilute acid treatment step. Said acid can be a dilute solution of mineral acid or carboxylic acid, preferably oxalic acid. The acid treatment step is conveniently conducted in inert liquid organic reaction media or the acid per se, particularly if a liquid organic carboxylic acid is employed. It is further conducted at temperatures ranging from about 25° to about 100°, preferably at reflux.

The principal reaction (I→III) is conveniently conducted in inert liquid organic reaction media and at temperatures ranging from about 0° to about 50° C. and for a period of time ranging from about 15 minutes to about 3 hours. Although the reaction proceeds using any proportion of reactants; in the preferred embodiments, from about 1.1 to about 1.5 moles of the benzoquinone is employed per mole of starting compound. As mentioned above, the reaction is preferably conducted under acidic conditions when employing a lower alkanol so as to proceed through the 12α-alkoxy intermediate (II).

After the reaction, the product compound (III) can be isolated and recovered via usual, conventional techniques, such as crystallization, filtration, decantation, and chromatography.

Thereafter, the 1,3,5(10),8,11-pentaenes (III) are treated in a dehydrogenation-hydrogenation sequence comprising dehydrogenation with palladium catalyst followed by exposure to hydrogen to yield the corresponding 1,3,5(10),6,8-pentaenes (IV). This dehydrogenation-hydrogenation sequence is conveniently conducted in inert liquid organic reaction media such as toluene, benzene, mesitylene, etc., followed by conventional recovery procedures.

With further reference to the above reaction sequence, the compounds represented by Formulas II and III are novel compounds of the present invention. These compounds are useful as intermediates, as herein described, for the preparation of compounds (IV). In addition, the compounds of Formula III are useful estrogenic agents in the estrogen replacement therapy and for the control and regulation of fertility.

The product compounds (IV) are known compounds and are useful and have been used as estrogenic agents. As such, compounds (III) and (IV) can be administered and used in the same manner as other estrogenic agents are used, such as mestranol.

The estra-1,3,5(10),9(11)-tetraene starting compounds of the present invention are known and can be prepared in accordance with known procedures. U.S. Pat. 3,385,872 describes some of these starting compounds. If desired, a 17-oxo starting compound can be utilized in the process of the present invention, as described above. Upon reaction end, the products can be further elaborated at the C-3 and C-17 positions. For example, the C-3 hydroxy group can be conventionally esterified or etherified. In accordance with known procedures, the 17-oxo group can be reduced or treated with organo metallic reagents. The resultant 17β-hydroxyl can be conventionally esterified or etherified.

In the present specification and claims, the term "lower alkyl" refers to and denotes a primary or secondary straight chain saturated hydrocarbon group containing from 1 to 6 carbon atoms and 1 and 2 and 3 . . . and 6 carbon atoms and 1 to 2 to 3 . . . to 6 carbon atoms.

Suitable benzoquinones for the purpose of the present invention include the ortho- and parabenzoquinone which can be unsubstituted or substituted with one or more groups, notably acyl and cyano and halogen, including, in the latter category, bromo, chloro, and fluoro. Typical benzoquinones include 1,2-benzoquinone,
1,4-benzoquinone,
2,3-dichloro-5,6-dicyano-1,4-benzoquinone,
tetrachloro-1,2-benzoquinone,
2,3-difluoro-1,4-benzoquinone,
2,3-dibenzoyl-1,4-benzoquinone,
2,3-dicyano-1,4-benzoquinone,
tetrachloro-1,4-benzoquinone,
2,3-difluoro-1,2-benzoquinone,
2,3-dicyano-1,2-benzoquinone, and the like. Preferred are those benzoquinones with an oxidation potential of about 0.9 and higher, for example, tetrachloro-1,2-benzoquinone,
2,3-difluoro-1,4-benzoquinone,
2,3-dicyano-1,4-benzoquinone,
2,3-dibenzoyl-1,4-benzoquinone, and
2,3-dichloro-5,6-dicyano-1,4-benzoquinone (DDQ).

The expression "conventional hydrolyzable esters and ethers" as used herein refers to those physiologically acceptable hydrolyzable ester groups and labile ether groups conventionally employed in the pharmaceutical are such as acetate, propionate, butyrate, trimethylacetate, valerate, methylethylacetate, caproate, t-buylacetate, 3-methylpentanoate, enanthate, caprylate, triethylacetate, pelargonate, decanoate, undecanoate, benzoate, phenylacetate, diphenylacetate, cyclopentylpropionate, methoxyacetate, aminoacetate, diethylaminoacetate, trichloroacetate, β-chloropropionate, bicyclo[2.2.2]octane-1-carboxylate, adamantoate, dihydrogen phosphate, dibenzyl phosphate, sodium ethyl phosphate, sodium sulfate, sulfate, tetrahydropyran-2-yl ether, tetrahydrofuran-2-yl ether, 4-methoxytetrahydropyran-4-yl, cyclopentyl ether and the like.

Suitable insert liquid organic reaction media for the purposes of the present invention include the usual compounds conventionally employed as solvents such as the aromatics, e.g. benzene and toluene; the ethers, e.g. tetrahydrofuran, dioxane and diethyl ether; the ketones, e.g. acetone; ethylene glycol and propylene glycol ethers, e.g. monoglyme and diglyme; and so forth.

In other embodiments of the present invention, the 12α-hydroxy- and -lower alkoxy-1,3,5(10),9(11)-tetraene compounds (II) can be hydrogenated, such as with platinum catalyst in inert, liquid reaction media, to prepare the corresponding 12α-hydroxy- and -lower alkoxy-1,3,5 (10)-triene compounds.

The following examples serve to further typify the manner by which the present invention can be practiced and represent, in one aspect, the best mode for carrying out the invention. As such, however, they should be construed merely as illustrative and not as limitative upon the overall scope hereof.

EXAMPLE 1

A solution of 3-methoxyestra-1,3,5(10),9(11)-tetraen-17-one (300 mg.) in 100 ml. of benzene is stirred at room temperature. To the stirred solution is added a solution of 360 mg. of 2,3-dichloro-5,6-dicyano-1,4-benzoquinone which is dispersed in 100 ml. of benzene. The anhydrous mixture is allowed to stand at room temperature overnight and is then filtered through a column of alumina. The filtrate is subjected to preparative thin layer chromatography on silica gel, impregnated with silver nitrate to provide the 3-methoxy-estra-1,3,5(10),8,11-pentaen-17-one product which can be recrystallized from methanol.

In a similar manner, the foregoing procedure can be practiced upon starting compounds bearing alternate C-3 ethers and C-3 esters as well as the corresponding C-17α elaborated C-17β hydroxy, ethers, or esters so as to prepare the corresponding 1,3,5(10),8,11-pentaene compounds bearing the respective substituents at the C-3, 17 positions, for example, 3-methoxyestra-1,3,5(10),8,11-pentaen-17β-ol,
3-methoxy-17α-methylestra-1,3,5(10),8,11-pentaen-17β-ol,
3-methoxy-17α-ethylestra-1,3,5(10),8,11-pentaen-17β-ol, and
3-methoxy-17α-ethynylestra-1,3,5(10),8,11-pentaen-17β-ol.

EXAMPLE 2

A solution of 100 mg. of 3-methoxyestra-1,3,5(10),9(11)-tetraen-17-one in 20 ml. of a 5% aqueous dioxane solution is prepared at room temperature. To this solution is added a solution of 120 mg. of 2,3-dichloro-5,6-dicyano-1,4-benzoquinone in 20 ml. of dioxane. After allowing the resultant mixture to stand at room temperature for about 10 minutes, 100 ml. of ethyl acetate are added and the resultant mixture poured into water. The resultant mixture is then extracted with sodium bicarbonate and the filtrate subjected to preparative thin layer chromatography to provide the 3 - methoxy-1,3,5(10),8,11-pentaen-17-one and 3 - methoxyestra - 1,3,5(10),9(11) - tetraen-12α-ol-17-one products.

In a similar manner, the foregoing procedure can be practiced upon the other C-3,17 elaborated compounds of the present invention so as to prepare the corresponding 1,3,5(10),8,11-pentaene and 12α-hydroxy-1,3,5(10), 9(11)-tetraene products, for example, 3-methoxyestra-1,3,5(10),8,11-pentaen-17β-ol,
3-methoxy-17α-methylestra-1,3,5(10),8,11-pentaen-17β-ol,
3-methoxy-17α-ethylestra-1,3,5(10),8,11-pentaen-17β-ol, and
3-methoxy-17α-ethynylestra-1,3,5(10),8,11-pentaen-17β-ol, and
3-methoxyestra-1,3,5(10),9(11)-tetraene-12α,17β-diol,
3-methoxy-17α-methylestra-1,3,5(10),9(11)-tetraene-12α,17β-diol,
3-methoxy-17α-ethylestra-1,3,5(10),9(11)-tetraene-12α,17β-diol, and
3-methoxy-17α-ethynylestra-1,3,5(10),9(11)-tetraene-12α,17β-diol.

EXAMPLE 3

To a solution of 1 gram of 3-methoxyestra-1,3,5(10), 9(11)-tetraen-17-one in 100 ml. of 3% methanolic benzene containing 0.5% p-toluene sulfonic acid are added 1.1 grams of 2,3-dichloro-5,6-dicyano-1,4-benzoquinone in 100 ml. of 3% methanolic benzene. The resultant solution is stirred at room temperature for a period of 1 hour. After this time, the resultant solution is extracted with aqueous sodium hydroxide solution and the benzene solution filtered through alumina to provide the 3-methoxyestra-1,3,5(10),8,11-pentaen-17-one and 3,12α-dimethoxyestra - 1,3,5(10),8,11 - pentaen - 17 - one products which can be recrystallized from methanol.

In a similar manner, the corresponding C-3,17 elaborated compounds of the present invention corresponding to the product identified in the foregoing procedure can be prepared utilizing the appropriate starting materials, for example, 3-methoxyestra-1,3,5(10),8,11-pentaen-17β-ol,
3-methoxy-17α-methylestra-1,3,5(10),8,11-pentaen-17β-ol,
3-methoxy-17α-ethylestra-1,3,5(10),8,11-pentaen-17β-ol,
3-methoxy-17α-ethynylestra-1,3,5(10),8,11-pentaen-17β-ol,
3,12α-dimethoxyestra-1,3,5(10),9(11)-tetraen-17β-ol,
3,12α-dimethoxy-17α-methylestra-1,3,5(10),9(11)-tetraen-17β-ol,
3,12α-dimethoxy-17α-ethylestra-1,3,5(10),9(11)-tetraen-17β-ol, and
3,12α-dimethoxy-17α-ethynylestra-1,3,5(10),9(11)-tetraen-17β-ol.

EXAMPLE 4

A solution of 15 mg. of 3-methoxyestra-1,3,5(10),9(11)-tetraen-12α-ol-17-one in 5 ml. of benzene and 3 mg. of oxalic acid is heated to the boiling point and maintained under reflux for 15 minutes with stirring. After this period, the solution is allowed to cool to room temperature and then filtered through a column of silica gel to provide the 3-methoxyestra-1,3,5(10),8,11-tetraen-17-one product which can be recrystallized from methanol.

In a similar manner, the C-3,17 elaborated products of Example 2 can be subjected to the foregoing procedure so as to prepare the corresponding 1,3,5(10),8,11-pentaene products i.e., 3 - methoxyestra - 1,3,5(10),8,11-pentaene - 17β - ol, 3 - methoxy - 17α - methylestra-1,3,5(10),8,11 - pentaen - 17β - ol, 3 - methoxy - 17α - ethylestra-1,3,5(10),8,11-pentaen-17β-ol, and so forth.

EXAMPLE 5

A solution of 100 mg. of the 3,12α-dimethoxyestra-1,3,5(10),9-tetraen-17-one in 25 ml. of benzene and 10 mg. of oxalic acid is heated to the boiling point and maintained under reflux conditions for one hour. After this reaction is complete, the resultant solution is filtered through a silica gel column to provide the 3-methoxyestra-1,3,5(10),8,11-pentaen-17-one product which can be recrystallized from methanol.

In a similar manner, by employing the C-3,17 substituted products of Example 3 in the foregoing procedure, there are prepared the corresponding 1,3,5(10),8,11-pentaene, products, i.e. 3-methoxyestra-1,3,5(10),8,11-pentaen - 17β - ol, 3-methoxy-17α-methyl-1,3,5(10),8,11-pentaen - 17β - ol, 3 - methoxy - 17α - ethylestra-1,3,5(10),8,11 - pentaen - 17β - ol, 3 - methoxy-17α-ethynylestra-1,3,5(10),8,11-pentaen-17β-ol, and so forth.

EXAMPLE 6

The procedure of Example 1 is repeated utilizing the following inert liquid organic reaction media in lieu of benzene with similar results in each instance.

| | |
|---|---|
| toluene | dioxane |
| mestylene | diethyl ether |
| tetrahydrofuran | diglyme |

The foregoing procedures are prepared conducting the reaction at a temperature of 35° instead of room temperature, with similar results in each instance.

EXAMPLE 7

The procedure of Example 2 is repeated utilizing, in lieu of aqueous dioxane, aqueous solutions of the inert liquid reaction media set forth in the previous example, with similar results in each instance.

The foregoing procedures are repeated employing a temperature of 5° instead of room temperature, with similar results in each instance.

EXAMPLE 8

The procedure of Example 3 is repeated utilizing, in lieu of acidic methanolic dioxane, acidic methanolic solutions of the inert liquid reaction media set forth in the previous example, with similar results in each instance.

EXAMPLE 9

The procedure of Example 3 is repeated using, in lieu of acidic methanolic benzene, acidic 3% benzene solutions with the alkanols of Column A, to prepare the corresponding 12α-alkoxy product of Column B.

| A: | B |
|---|---|
| Ethanol | 3-methoxy-12α-ethoxyestra-1,3,5(10),9-tetraene-17-one. |
| n-Propanol | 3-methoxy-12α-n-propoxyestra-1,3,5(10),9-tetraene-17-one. |
| Isopropanol | 3-methoxy-12α-isopropoxyestra-1,3,5(10),9-tetraen-17-one. |
| n-Butanol | 3-methoxy-12α-n-butoxyestra-1,3,5(10),9-tetraen-17-one. |

The foregoing procedures are repeated employing a temperature of 35° instead of room temperature, with similar results in each instance.

EXAMPLE 10

The procedures of Examples 4 and 5 are repeated utilizing, in lieu of oxalic acid, the following dilute acids, with similar results in each instance.

acetic acid
propionic acid
maleic acid
2.5% hydrogen chloride in chloroform

The foregoing procedures are conducted at 50° C. instead of reflux, with similar results in each instance.

EXAMPLE 11

The procedures of Examples 1, 2, and 3 are repeated utilizing, in lieu of 2,3-dichloro-5,6-dicyano-1,4-benzoquinone, the following benzoquinones with similar results in each instance.

tetrachloro-1,2-benzoquinone
2,3-difluoro-1,4-benzoquinone
2,3-dicyano-1,4-benzoquinone
2,3-dibenzoyl-1,4-benzoquinone

EXAMPLE 12

In accordance with the foregoing methods, the following are prepared.

3-methoxyestra-1,3,5(10),8,11-pentaen-17β-ol,
Estra-1,3,5(10),8,11-pentaene-3,17β-diol,
3,17β - diacetoxyestra-17α-methylacetoxy-1,3,5(10),8,11-pentaene,
3 - methoxy-17α-ethynyl-17β-tetrahydropyran-2'-yloxyestra-1,3,5(10),8,11-pentaene,
3 - ethoxy - 17α-propynylestra-1,3,5(10),8,11-pentaen-17β-ol,
3,17β - bis(tetrahydrofuran-2'-yloxy) - 17α-vinylestra-1,3,5(10),8,11-pentaene,
3 - methoxy-17α-ethyl-17β-propionyloxyestra-1,3,5(10),8,11-pentaene,
3 - methoxyestra-1,3,5(10),9,(11)-tetraene-12α,17β-diol,
12α-methoxyestra-1,3,5(10),9(11)-tetraene-3,17-diol,
3,17β - diacetoxy - 12α - ethoxy-17α-methylestra-1,3,5(10),9(11)-tetraene,
3 - methoxy - 12α-n-propoxy-17α-ethynyl-17β-tetrahydropyran-2'-yloxyestra-1,3,5(10),9(11)-tetraene,
3 - ethoxy - 12α-n-butoxy-17α-propynylestra-1,3,5(10),9(11)-tetraene-17β-ol, 3,17β-bis(tetrahydrofuran-2'-yloxy) - 12α - n - pentoxy-17α-vinylestra-1,3,5(10),9(11)-tetraene, 3 - methoxy - 12α-n-hexyloxy-17α-ethyl-17β-propionyl-oxyestra-1,3,5,(10),9(11)-tetraene, 3 - methoxy - 12α-methoxy-17α-propenyl-17β-acetoxy-estra-1,3,5(10),9(11)-tetraene, and 3 - methoxy - 12α-methoxy-17α-n-propyl-17β-acetoxy-estra-1,3,5(10),9(11)-tetraene.

EXAMPLE 13

3 - methoxyestra-1,3,5(10),8,11-pentaen-17-one (50 mg.) is dispersed in 10 ml. of toluene containing 10 mg. of 10% palladium on carbon catalyst. The reaction mixture is refluxed for two hours and cooled to room temperature. The resultant mixture is kept under a hydrogen atmosphere overnight with stirring. The resultant mixture is subjected to preparative thin layer chromatography on silica gel impregnated with silver nitrate to provide the 3-methoxyestra-1,3,5(10),6,8-pentaene-17β-one product.

In accordance with the foregoing procedure, the other 1,3,5(10),8,11-pentaene compounds prepared in Examples 1 to 12 are similarly converted to the corresponding 1,3,5(10),6,8-pentaene products, namely, 3-methoxyestra-1,3,5(10),6,8-pentaen-17β-ol,
3-methoxy-17α-methylestra-1,3,5(10),6,8-pentaen-17β-ol,
3-methoxy-17α-ethylestra-1,3,5(10),6,8-pentaen-17β-ol,
3-methoxy-17α-ethynylestra-1,3,5(10),6,8-pentaen-17β-ol,
estra-1,3,5(10),6,8-pentane-3,17β-diol,
3,17β-diacetoxy-17α-methylestra-1,3,5(10),6,8-pentaene, and so forth.

EXAMPLE 14

3 - methoxyestra - 1,3,5(10),9(11)-tetraene-12α-ol-17-one (25 mg.) is dispersed in 100 ml. of ethyl acetate containing 5 mg. of platinum oxide and the resultant mixture kept under a hydrogen atmosphere overnight with stirring. The resultant mixture is subjected to preparative thin layer chromatography to provide the 3-methoxy-estra-1,3,5(10)-triene-12α-ol-17-one product.

The foregoing procedure can be practiced upon the other 12α-hydroxy compounds prepared above as well as the corresponding 12α-alkoxy compounds prepared as described above, to prepare the corresponding 12α-hydroxy- and -alkoxy-1,3,5(10)-triene products.

What is claimed is:

1. A compound selected from the group of compounds represented by the formulas:

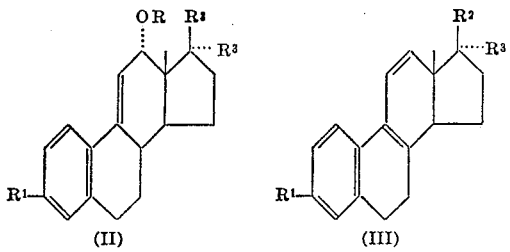

wherein

R is hydrogen or lower alkyl;
$R^1$ is hydroxy or a conventional ester or ether thereof;
$R^2$ is hydroxy or a conventional ester or ether thereof;
$R^3$ is hydrogen, alkyl of 1 to 3 carbon atoms, alkenyl of 1 to 3 carbon atoms, or alkynyl of 1 to 3 carbon atoms; or
$R^2$ and $R^3$ taken together are an oxo group.

2. A compound selected from those of Formula II of claim 1.

3. A compound selected from those of claim 2 wherein R is hydrogen or methyl.

4. A compound selected from those of claim 3 wherein $R^1$ is methoxy and $R^2$ and $R^3$ taken together are an oxo group.

5. A compound selected from those of claim 3 wherein $R^1$ is methoxy, $R^2$ is hydroxy, and $R^3$ is hydrogen.

6. A compound selected from those of claim 3 wherein $R^1$ is methoxy, $R^2$ is hydroxy, and $R^3$ is methyl.

7. A compound selected from those of claim 3 wherein $R^1$ is methoxy, $R^2$ is hydroxy, and $R^3$ is ethyl.

8. A compound selected from those of claim 3 wherein $R^1$ is methoxy, $R^2$ is hydroxy, and $R^3$ is ethynyl.

9. A compound selected from those of Formula III of claim 1.

10. A compound selected from those of claim 9 wherein $R^1$ is methoxy and $R^2$ and $R^3$ taken together are an oxo group.

11. A compound selected from those of claim 9 wherein $R^1$ is methoxy, $R^2$ is hydroxy, and $R^3$ is hydrogen.

12. A compound selected from those of claim 9 wherein $R^1$ is methoxy, $R^2$ is hydroxy, and $R^3$ is methyl.

13. A compound selected from those of claim 9 wherein $R^1$ is methoxy, $R^2$ is hydroxy, and $R^3$ is ethyl.

14. A compound selected from those of claim 9 wherein $R^1$ is methoxy, $R^2$ is hydroxy, and $R^3$ is ethynyl.

15. A process which comprises treating an estra-1,3,5(10),9(11)-tetraene with a benzoquinone to prepare the corresponding estra-1,3,5(10),8,11-pentaene.

16. A process of claim 15 conducted in inert liquid organic reaction media and at a temperature of from 0° to 50°.

17. A process of claim 16 conducted under anhydrous conditions.

18. A process of claim 15 conducted under aqueous conditions to prepare the corresponding 12α-hydroxyestra-1,3,5(10),9(11)-tetraene in addition to the estra-1,3,5(10),8,11-pentaene.

19. A process of claim 18 including the additional step of converting the 12α-hyroxyestra-1,3,5(10),9(11)-tetraene to the corresponding estra-1,3,5(10),8,11-pentaene with dilute acid.

20. A process of claim 15 conducted under acidic conditions in the presence of a primary or secondary lower alkanol to prepare the corresponding 12α-lower alkoxy-estra-1,3,5(10),9(11)-tetraene in addition to the estra-1,3,5(10),8,11-pentaene.

21. A process of claim 20 including the aditional step of converting the 12α-lower alkoxyestra-1,3,5(10),9(11)-tetraene to the corresponding estra-1,3,5(10),8,11-pentaene with dilute acid.

22. A process of claim 15 wherein said benzoquinone is selected from the group consisting of tetrachloro-1,2-benzoquinone, 2,3-difluoro-1,4-benzoquinone, 2,3-dicyano-1,4-benzoquinone, 2,3-dibenzoyl-1,4-benzoquinone, and 2,3-dichloro-5,6-dicyano-1,4-benzoquinone.

23. A process of claim 22 wherein said benzoquinone is 2,3-dichloro-5,6-dicyano-1,4-benzoquinone.

24. A process which comprises treating an estra-1,3,5(10),9(11)-tetraene with a benzoquinone to prepare the corresponding estra-1,3,5(10),8,11-pentaene and dehydrogenating the latter with palladium catalyst followed by hydrogenation to give the corresponding estra-1,3,5(10),6,8-pentaene.

References Cited

UNITED STATES PATENTS 3,476,780  11/1969  Smith et al. _____ 260—397.3
3,536,736  10/1970  Diassi _____ 260—397.45

ELBERT L. ROBERTS, Primary Examiner

U.S. Cl. X.R.

260—397.5, 239.55